3,340,200
REMOVAL AND DISPOSAL OF RADIOACTIVE
CONTAMINANTS IN MIXED ION EXCHANGE
RESINS WITH ALKALI METAL HALIDE
John H. Noble, Wellesley, Mass., assignor to Stone &
Webster Engineering Corporation, Boston, Mass., a
corporation of Massachusetts
No Drawing. Filed Sept. 15, 1964, Ser. No. 396,752
9 Claims. (Cl. 252—301.1)

This invention relates to a method of conveniently removing all or a substantial portion of the radioactivity contained in radioactively contaminated mixed bed ion exchange resin systems, thereby facilitating handling of the resin and disposal of the radioactive contaminants.

Water is frequently employed in connection with nuclear reactors for many purposes. For example, water can be used as a moderator, a reflector, a solvent, or a coolant in various types of reactors. By virtue of its proximity to the reactor core and the sources of radiation, the water employed almost invariably becomes contaminated with varying amounts of radioactive contaminants. Such contaminants include radioactive isotopes of strontium, thorium, iodine, plutonium and uranium.

A problem is generally posed when it is desired to remove some or all of the radioactivity from such water, either to permit reuse or to permit convenient ultimate disposal of the water. The use of ion exchange resins to remove the radioactive contaminants from the water has been suggested. Generally, this involves treatment of the water with a mixed ion exchange resin, i.e., an ion exchange resin containing a mixture of a cation exchange resin and an anion exchange resin, to remove both the radioactive anions and the radioactive cations. In such processes, the ion exchange resins are normally discarded after one use. Such contaminated resins must be disposed of carefully, using proper shielding and the like to prevent serious harm. In view of the relatively large volume occupied by the ion exchange resin, the cost of materials required for proper shielding is extremely high.

In the rare occasions when mixed bed ion exchange resins are regenerated, the anion and cation resins are first separated, as by flotation techniques and then separately regenerated, a very costly procedure.

It has now been found that mixed bed ion exchange resins contaminated with radioactive impurities can be stripped of all or of a substantial portion of the radioactivity, sufficient to permit either reuse of the resin or more convenient disposal of both the resin and of the radioactive contaminants removed therefrom.

It has been found that the radioactive impurities can be removed from the mixed bed ion exchange resin by treatment with an alkali metal halide solution. The alkali metal halide solution can then be treated so as to recover the radioactive wastes in solid form and very small quantity for convenient disposal, such as burying or the like. The treated resin can then be reused or disposed of with little or no shielding required.

In general, in accordance with conventional techniques, the mixed ion exchange resin employed for removing radioactivity will contain from about 30% to 70% by volume of a cation exchange resin and from about 70% to 30% of an anion exchange resin. The flow rate of the radioactively contaminated water through the ion exchange resin is suitably adjusted to conform to the quantity and exchange capacity of the ion exchange resin employed in order to insure adequate exchange time.

After the water passes through the column, either by upward or downward flow, as desired in order to insure adequate contact time, the water will have been freed of its radioactive impurities and can thereafter be either reused or disposed of as in the conventional manner.

Two basic steps are involved in the practice of this invention. In the first step, a dilute aqueous solution of an alkali metal halide is flowed upwardly through the mixed ion exchange resin bed or column at a flow velocity sufficient to cause an expansion in the volume occupied by the resin of from about 25% to 100% and, preferably from about 50% to 75% of the original volume occupied by the resin. Care must be exercised to insure that the flow rate is not such that resin will be forced out of the column. This flow rate is maintained for a period of from about 1 to 15 minutes, depending generally upon the dimensions of the column, the volume of the resin and the degree of radioactivity. From 5 to 10 minutes is generally preferred. A volume of from about 25 to about 150 gallons of solution per cubic foot of resin is usually sufficient. This dilute aqueous solution will generally contain from about 5 to 20 parts by weight of alkali metal halide per 100 parts by weight of water and serves to dislodge any impurities which have accumulated with the ion exchange resin and also begins to exchange alkali metal cations and halide anions for the ions removed by the resin from the treated water including the radioactive anions and cations.

Thereafter, to complete the ion exchange resin regeneration, a concentrated aqueous alkali metal halide solution is flowed, preferably in a direction opposite to that of the dilute solution, through the bed or column. The quantity of concentrated solution flowed through will be strictly dependent upon the degree of radioactivity of the resin. The flow of solution is stopped as soon as it is determined by suitable means that the level of radioactivity possessed by the solution entering the column or bed is the same as the level of radioactivity of the solution leaving the column, indicating that no further exchange is taking place. Of course, the faster the rate of flow, within reasonable bounds, the sooner this equilibrium point will be reached. The concentrated alkali metal halide solution is preferably saturated with alkali metal halide but can be somewhat less concentrated, preferably having a minimum concentration of 15 parts by weight of alkali metal halide per 100 parts by weight of water. The amount of concentrated solution required will generally be within the range of from about 10 to 75 gallons per cubic foot of resin.

After the treatment, the ion exchange resin will have been substantially freed of radioactive contaminants and can be reused or otherwise disposed of with only minimal precautions. The temperature of treatment is unimportant and can be adjusted to suit the characteristics of the resin or the surrounding environment.

Most of the radioactive contaminants are removed from the resin by the dilute alkali metal halide solution. This dilute solution can then be evaporated to dryness in conventional evaporation equipment leaving a small quantity of an ordinary alkali metal halide salt containing traces of radioactive impurities. This final product is in solid form, occupies very little space, and hence can be disposed of conveniently and economically in accordance with conventional techniques for disposing of radioactive materials. The quantity of alkali metal halide salt actually disposed of is quite low and hence its cost is not very great.

The concentrated aqueous solution which will contain very little radioactive contamination after passage through the ion exchange resin is diluted with water in sufficient quantity to make up a dilute aqueous alkali metal halide solution for use in the next regeneration operation. Alternatively, if another regeneration operation is not contemplated in the near future, this solution can also be evaporated and disposed of as is in the case of the dilute solution.

The preferred alkali metal halide is sodium chloride, which is a very inexpensive and easily available material; however, where desired, other alkali metal halides can be used such as, for example, the chlorides, bromides and iodides of lithium, sodium and potassium.

The ion exchange resins employed for the decontamination of water can be any of those conventionally used. The anion resin can, for example, be in the hydroxyl form or in the halide state corresponding to the halide of the alkali metal halide employed in this invention and the cation resin can, for example be in the hydrogen form or in the alkali metal form.

It is of no consequence to this invention whether the ion exchange resins employed are naturally occurring materials or are synthetic materials.

The synthetic ion exchange resins consist essentially of a crosslinked polymer network to which are attached ionized or ionizable groups. In the case of cation exchange resins, these groups are acidic groups (e.g., $—SO_3H$, $—PO_3H_2$, $—CO_2M$, phenolic hydroxyl) while in anion exchange resins the groups are basic in character (e.g., quaternary ammonium, aliphatic or aromatic amine groups).

In the synthesis of ion exchange resins, the ionizable groups may be attached to the monomers or intermediates used in preparation of the crosslinked polymer, or they may be introduced subsequently into a preformed polymer.

Many important strongly used cation exchange resins are prepared by sulfonating styrene-divinylbenzene copolymers as described in U.S. Patent No. 2,366,007.

Many strongly basic anion exchange resins are prepared by treating crosslinked polystyrene with chloromethyl ether in the presence of a Friedel-Crafts catalyst. The chloromethylated product is then treated with a tertiary amine, e.g., trimethylamine, to give a resin containing strongly basic quaternary ammonium groups. The crosslinked polystyrene is generally a copolymer with up to about 10% divinylbenzene.

Additional details on the structures and syntheses of ion exchange resins can be had from the book "Ion Exchange Resins" by Kunin and Myers (Wiley, 1950).

Further details on the method of this invention can be obtained from the following example which represents, in the opinion of the inventor, the best mode of carrying out the invention.

A five foot high ion exchange column containing 100 cubic feet of mixed ion exchange resin of which 60% by volume was a cation exchange resin and 40% by volume was an anion exchange resin was contaminated with radioactive contaminants as a result of its use in purifying reactor primary system water. The cation exchange resin was Nalcite HCR-W, a monofunctional sulfonated copolymer of styrene and divinylbenzene and the anion exchange resin was Nalcite SBR, a quaternary ammonium copolymer of styrene and divinylbenzene.

The column was placed on a two-stage regeneration cycle to substantially decontaminate the resin. In the first stage, 672 gallons of a 10% aqueous sodium chloride solution at a temperature of 100° F. were passed upwardly through the column at a rate of 5 gallons per minute per square foot of resin surface area thereby giving an approximately 60% expansion of the resin and removing from the resin the collected particulate material and a major portion of the radioactive contaminants that had been picked up by the resin during its exchange cycle. The flow rate selected was just short of the rate that would force resin particles from the top of the column. The sodium chloride solution, with its content of undesirable components, emerging at the top of the column, was passed to an evaporator. Thereafter, as a second stage, 390 gallons of saturated sodium chloride solution was passed downwardly through the column, at a rate of 0.5 gallon per minute per cubic foot of resin, thereby giving a more complete removal of the undesirable components. The downflow solution emerging at the bottom of the column was retained and diluted to make a 10% sodium chloride solution for use in a later regeneration step. The solution in the evaporator was treated to evaporate all of the water, leaving behind a small volume of sodium chloride containing radioactive contaminants. This very small amount of solid material was then disposed of in accordance with conventional handling techniques for solid radioactive wastes. The ion exchange resin could be reused, if desired, or could be disposed of more economically than heretofore since it is no longer dangerously radioactive, the bulk of the radioactivity having been transferred to a relatively small volume of solid sodium chloride.

I claim:

1. A process for decontaminating a mixed cation-anion ion exchange resin containing radioactive contaminants comprising flowing a dilute aqueous solution of an alkali metal halide through a bed of the contaminated resin and thereafter flowing a concentrated aqueous solution of an alkali metal halide in reverse direction through the bed, the rate of flow of the dilute solution being sufficient to cause the resin to expand in volume by at least about 25%, and removing the water from the dilute aqueous alkali metal halide solution passed through the bed to leave a small quantity of solid radioactive waste material.

2. A process as in claim 1 wherein the concentrated solution is flowed through the ion exchange resin for a period of time until the radioactivity level of the solution entering the treating area is approximately equal to the radioactivity level of the solution leaving the treating area.

3. A process as in claim 2 wherein the alkali metal halide is sodium chloride.

4. A process as in claim 3 wherein the concentrated alkali metal halide solution is a saturated sodium chloride solution.

5. A process as in claim 4 wherein the mixed cation-anion ion exchange resin comprises from about 30% to 70% by weight of a cation exchange resin and from about 70% to 30% of an anion exchange resin.

6. In a process for removing and disposing of radioactive contaminants contained in water comprising flowing the contaminated water through a bed of mixed cation-anion ion exchange resin containing from about 30% to 70% by weight of a cation ion exchange resin and from about 70% to 30% of an anion ion exchange resin, thereby causing the radioactive contaminants to be exchanged from the water to the resin, the improvement which permits either reuse of the resin or more convenient disposal thereof which comprises flowing a dilute aqueous solution of an alkali metal halide through the bed at a rate of flow sufficient to cause the resin to expand in volume by at least about 25%, thereafter flowing a concentrated aqueous solution of an alkali metal halide in reverse direction through the bed, and removing the water from the dilute aqueous alkali metal halide solution passed through the bed to leave a small quantity of solid radioactive waste material.

7. A process as in claim 6 wherein the concentrated solution is flowed through the ion exchange resin for a period of time until the radioactivity level of the solution entering the treating area is approximately equal to the radioactivity level of the solution leaving the treating area.

8. A process as in claim 7 wherein the alkali metal halide is sodium chloride.

9. A process as in claim 6 wherein the concentrated aqueous solution of a metal halide passed through the bed is diluted with water to form a dilute aqueous solution of a metal halide for use in a later regeneration step of the process.

References Cited

UNITED STATES PATENTS

| | | | |
|---|---|---|---|
| 2,811,412 | 10/1957 | Poirier | 23—338 |
| 2,892,679 | 6/1959 | Fuentevilla | 252—301.1 |
| 3,079,225 | 2/1963 | Baybarz et al. | 23—338 |
| 3,154,500 | 10/1964 | Jansen et al. | 252—301.1 |
| 3,252,920 | 5/1966 | Goren | 23—338 |

OTHER REFERENCES

CPE Survey, Treatment and Disposal of Radioactive Wastes, January 1961 (pages 15–19).

CARL D. QUARFORTH, *Primary Examiner.*

BENJAMIN R. PADGETT, *Examiner.*

S. J. LECHERT, Jr., *Assistant Examiner.*